United States Patent [19]

Cheng et al.

[11] Patent Number: 5,765,665
[45] Date of Patent: Jun. 16, 1998

[54] BRAKE ASSEMBLY FOR SIMULTANEOUSLY HOLDING A PAIR OF WHEELS

[76] Inventors: Kenny Cheng, No. 16, Lane 47, Chih Feng St., Taipei; Kai-Ming Yang, 3rd Floor, No. 5, Alley 205, Kuo Kuang St., Chung ho City, Taipei Hsien, both of Taiwan

[21] Appl. No.: 686,622

[22] Filed: Jul. 24, 1996

[30] Foreign Application Priority Data

Feb. 17, 1996 [CN] China ................... 96 204806. 2

[51] Int. Cl.$^6$ ........................... B62B 5/04
[52] U.S. Cl. ................. 188/20; 188/1.12; 188/31; 188/22
[58] Field of Search ............... 188/20, 31, 69, 188/60, 1.12, 2 F, 22, 19, 111, 265; 280/47.38, 650; 16/35 R

[56] References Cited

U.S. PATENT DOCUMENTS

| 759,985 | 5/1904 | Grabler | 188/22 |
|---|---|---|---|
| 1,730,676 | 10/1929 | Miller | 188/22 |
| 1,735,541 | 11/1929 | Miller | 188/22 |
| 1,915,286 | 6/1933 | Bleustein | 188/20 |
| 1,980,211 | 11/1934 | Kroll et al. | 188/20 |
| 2,480,431 | 8/1949 | Welsh | 188/20 |
| 2,864,465 | 12/1958 | Welsh et al. | 188/20 |
| 2,905,275 | 9/1959 | Kostolecki et al. | 188/74 |
| 4,175,783 | 11/1979 | Pioth | 188/1.12 |
| 4,527,665 | 7/1985 | Shamie | 188/20 |
| 4,953,667 | 9/1990 | Bigo | 188/20 |
| 4,985,960 | 1/1991 | Zun | 188/31 |
| 4,997,066 | 3/1991 | Bigo | 188/31 |
| 5,394,962 | 3/1995 | Gray | 188/111 |
| 5,476,275 | 12/1995 | Baechler et al. | 280/47.38 |
| 5,517,718 | 5/1996 | Eichhorn | 188/1.12 |

FOREIGN PATENT DOCUMENTS

| 1580190 | 2/1970 | Germany | 188/20 |
|---|---|---|---|
| 2242655 | 10/1991 | United Kingdom | 188/20 |

*Primary Examiner*—Douglas C. Butler

[57] ABSTRACT

The present application relates to a brake assembly for simultaneously holding a pair of wheels, which is used in, for example, the rear wheels of a stroller, wherein the two rear wheels are each provided with a pivotal block having a protruding brake member and pivotally connected to a wheel axle respectively. The pivotal blocks are coupled to each other by the wheel axle such that when either one of the stopping pedals is stepped down by the user, the engaging protruding elements provided on the pivotal block of both wheels are engaged between the stopping ribs of both two rear wheels and holding both wheels simultaneously.

12 Claims, 6 Drawing Sheets

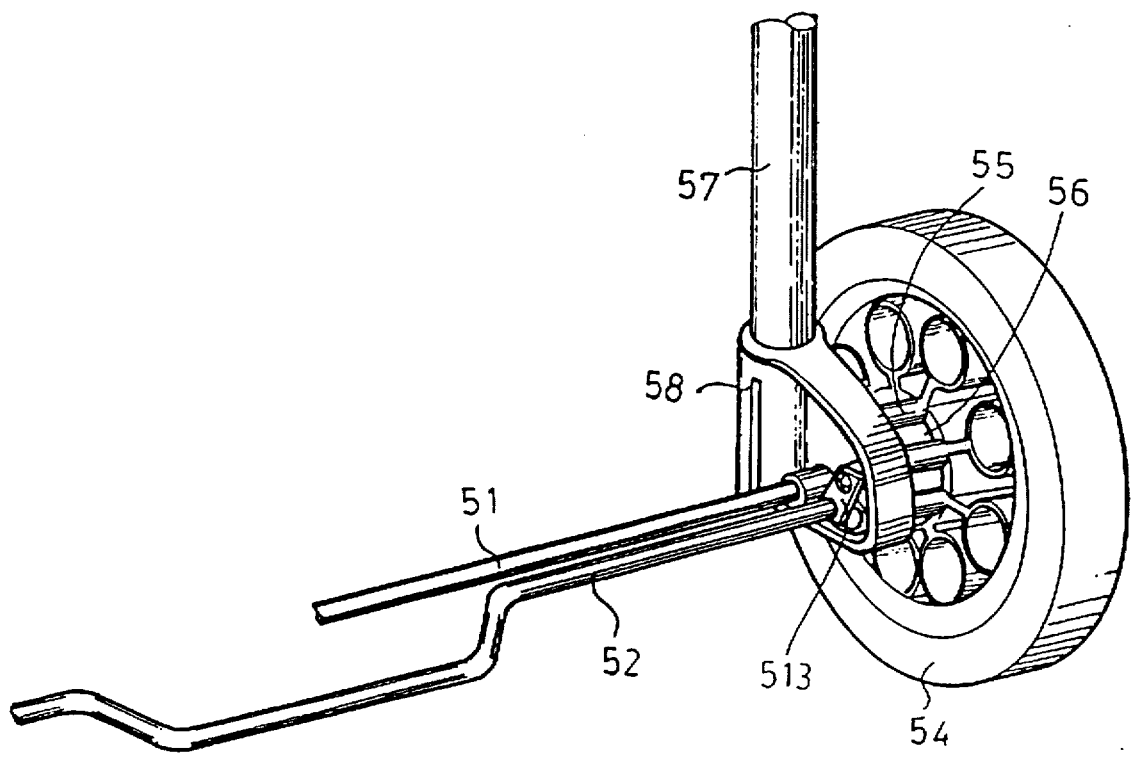
FIG·6

5,765,665

BRAKE ASSEMBLY FOR SIMULTANEOUSLY HOLDING A PAIR OF WHEELS

FIELD OF THE INVENTION

The present application relates to a brake assembly for simultaneously holding paired wheels, particularly, to a brake assembly for simultaneously holding a pair of wheels for use in a stroller.

BACKGROUND OF THE INVENTION

The brake assembly for simultaneously holding a pair of wheels of a stroller is widely used in the stroller field. In some countries such as the United Kingdom, it is even mandatory that a stroller must be capable of simultaneously holding a pair of wheels, which is the so-called "one-touch-brake-function," to improve the safety of a stroller.

Due to statutory regulations and practical necessity, such a brake assembly for simultaneously holding a pair of wheels has become standard stroller equipment. Such a brake assembly should be safe, stable, and convenient in use; in addition, it is also important to simplify the structure of the brake assembly, so as to reduce the cost on one hand and to improve the durability of the assembly on the other.

A brake assembly of "one-touch brake function" is shown in FIGS. 5 and 6, in which the protruding brake elements (53) of a pair of wheels are coupled with each other by means of a link (52) arranged parallel to the wheel axle (51) so as to achieve the effect of simultaneously braking a pair of wheels (54). In such prior art, when the link (52) is stepped down, the protruding brake elements (53) provided on each wheel respectively are simultaneously engaged between ribs (55) whereby the pair of wheels (54) are simultaneously stopped.

In the aforementioned prior art above, the brake assembly comprises two (one of which is not shown) rear wheel frameworks (58), each of which is provided with a rear wheel base (58) on a bottom end thereof, the rear wheel base (58) having an axle hole (59), a pivot hole (510) and an arc-shaped hole (511) adjacent to the pivot hole. The wheel axle (51) and the link (52) are inserted into the axle holes (59) and the arc-shaped hole (511) respectively, and two (one of which is not shown) pivotal plates (513) extending laterally from the link (52) are pivotally connected in the pivot holes by screws (514) (one of which is not shown) such that the link (52) may be operated pivotally with respect to the pivot holes (510) (or the screw (514)).

As seen from the above, the prior brake assembly is of a very complicated structure which results in disadvantages. For example, the pivotal plate (513) (the screw (514)) must be connected in the pivot holes with a proper level of tightness, that is, if the connection is too tight, the resistance against the pivotal movement of the link will be excessive to hinder its operation. On the other hand, a loose connection may cause incidental pivotal movements of the link to undesirably stop the stroller (the wheels) frequently. Even if the connection between the pivot holes (510) and the screw (514) is carefully adjusted to a precise level of tightness, the screw (514) will still become loose after a period of time however tight they may be.

In addition, the number of elements in the prior art brake assembly is large so that its cost is high.

SUMMARY OF THE INVENTION

In order to solve the above problems, the present application provides a brake assembly for simultaneously holding paired wheels for use in a stroller. The present application is characterized by combining the function of the link into the function of the wheel axle such that the wheel axle functions to both stabilize the rear wheels of a stroller and to link the brakes for the pair of wheels.

An object of the present application is to simplify the structure of a stroller by removing the link and combining the function of the link into the function of the rear wheel axle.

Another object of the present application is to reduce the cost of a stroller by removing the link and combining the function of the link into the function of the rear wheel axle.

A further object of the present application is to provide a resistant force against the pivotal movement by removing the link and combining the function of the link into the function of the rear wheel axle to stabilize the engagement or disengagement operations between the protruding brake element and the ribs.

A still other object of the present application is to facilitate the operation of stopping a stroller by uniting the rear wheel axle with the link.

BRIEF DESCRIPTION OF DRAWINGS

FIG. 6 is a perspective view showing the conventional brake assembly for simultaneously holding paired wheels.

DETAILED DESCRIPTION OF PREFERRED EMBODIMENTS

Figure 1:
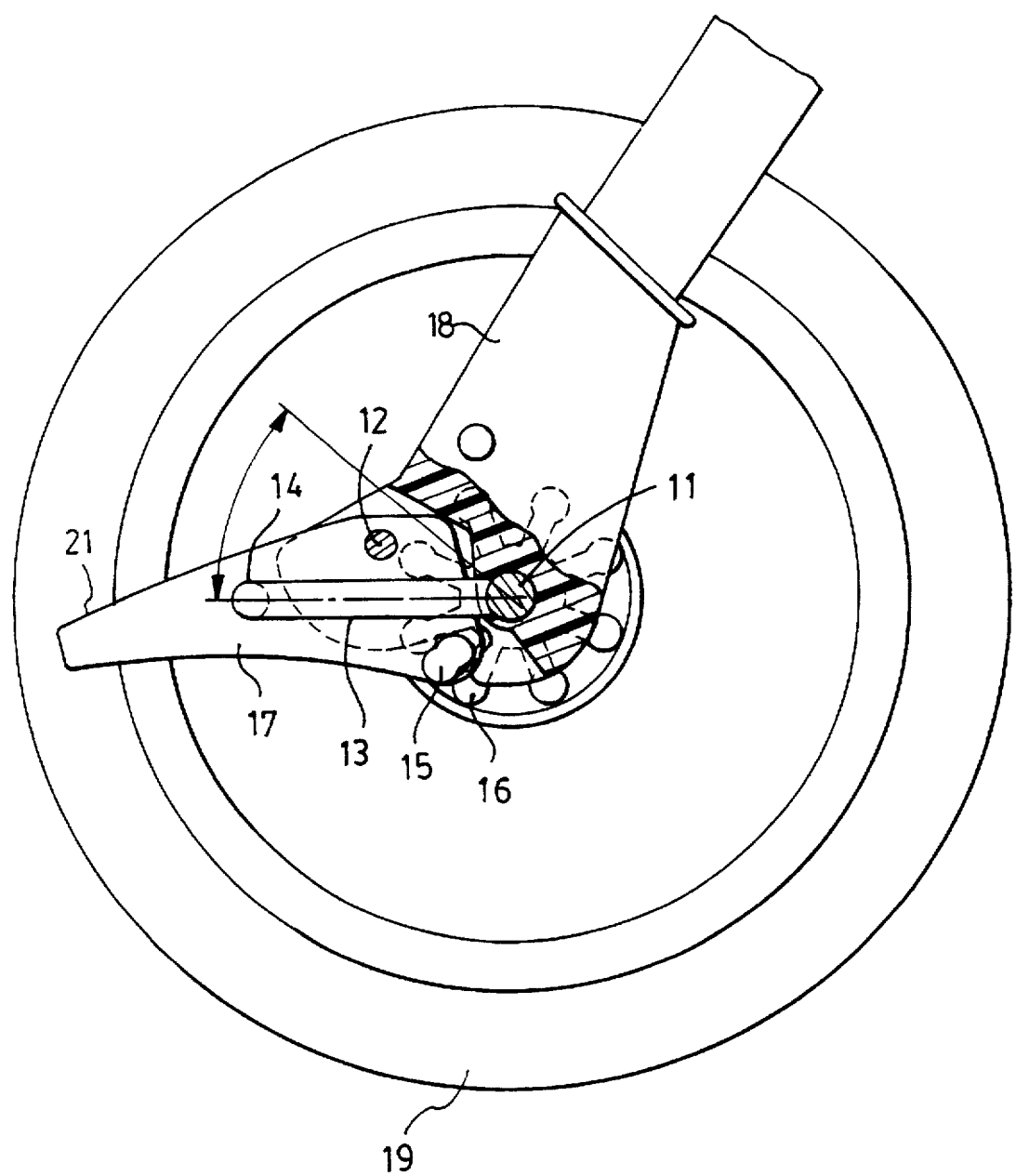
FIG. 1 is a plan view showing the operation of a brake assembly for simultaneously holding paired wheels according to the present application.

The basic principle according to the present application will be described in detail with reference to FIG. 1. Referring to FIG. 1, which shows a side view of one wheel, a pivotal block (17) which connects to the rear wheel axle (11) by a bent stick (13) is pivotable with respect to the rear wheel axle (11). The pivotal block (17) is pivotally connected to the rear wheel base (18) with the pivotal rivet (12) such that the pivotal block (17) is pivotable with respect to the pivotal rivet (12).

As seen from FIG. 1, the pivotal block (17) is provided with a protruding brake element (15) at a corner adjacent to the rear wheel axle (11). The protruding brake element (15), which is parallel to ribs (16), perpendicularly protrudes from the surface of the pivotal block (17) facing the wheel, such that the protruding brake element (15) may be engaged between two ribs (16) for holding the rear wheels (19). The ribs (16) constitute a rib where with a predetermined pitch; i.e., the distance between two adjacent ribs (16) should be properly determined based on the sectional dimension of the protruding brake element (15).

It should be noted that the pivotal rivet (12) is located at the vicinity of the mid-point between the rear wheel axle (11) and the connecting point (14) of the pivotal block (17) and the bent stick (13). Moreover, the pivotal rivet (12) is also located at the vicinity of the mid-point between the location of the bent stick (13) under a locked state and the location of the bent stick (13) under an unlocked state. The reasons for this arrangement are explained below.

As described, the pivotal block (17) shall pivot with respect to the rear wheel axle (11) and the pivotal rivet (12) at the same time. However the rear wheel axle (11) and the pivotal rivet (12) are not coaxially located. When the pivotal block (17) is operated by the user to take a pivotal movement, a resistant force is generated due to the mutual opposition between the two pivot axles, i.e. the wheel axle (11) and the pivotal rivet (12). If the rear wheel axle (11), the pivotal rivet (12) and the connecting point (14) of the bent stick are not located according to the relationship defined above, the resistant force against the pivotal movement of the pivotal block (17) will be excessive such that a pivotal movement will become impossible. For example, if the pivotal rivet (12) is located away from the vicinity of the mid-point between the location of the bent stick (13) under a locked state and the location of the bent stick (13) under an unlocked state, then the resistant force will be excessive and a pivotal movement is impossible. Similarly, if the pivotal rivet (12) is located at a position which is very close to or far away from the rear wheel axle (11), that is, away from the vicinity of the mid-point between the rear wheel axle (11) and the connecting point (14) of the pivotal block (17) and the bent stick (13), the protruding brake element (15) provided on the stopping pivotal block (17) will fail engaged between the ribs (16). Accordingly, the pivotal rivet (12) should be located at the vicinity of the mid-point between the rear wheel axle (11) and the connecting point (14) of pivotal block (17) and bent stick (13) and at the vicinity of the mid-point between the location of the bent stick (13) under a locked state and the location of the bent stick (13) under an unlocked state.

With reference to FIG. 1, when two circles are drawn with the rear wheel axle (11) and the pivotal rivet (12) being the two centers and the length of the bent stick (13) and the distance between the pivotal rivet (12) and the connecting point of the bent stick (13) being the two radii respectively, these two circles intersect each other at two points, which are two stable locations between which a non-coaxial pivotal movement may proceed. At the upper stable location the brake assembly is unlocked while at the lower stable location the brake assembly is locked. With the elastic deformation of the bent stick (13) and the flexibility of the structure, the pivotal block (17) is allowed to be operated between these two stable locations upon exerting a proper force, but the pivotal block (17) will not stay in the unstable area between these two stable locations. Meanwhile, if no force over a predetermined level is applied on the pivotal block, no incidental pivotal movement of the stopping pivotal block will occur. In other words, the protruding brake element (15) will not be engaged between or disengaged from the ribs (16). Thus the safety of the assembly can be ensured.

The features and advantages of the present application will become more apparent by the description of the following embodiments.

The First Embodiment

Figure 2:
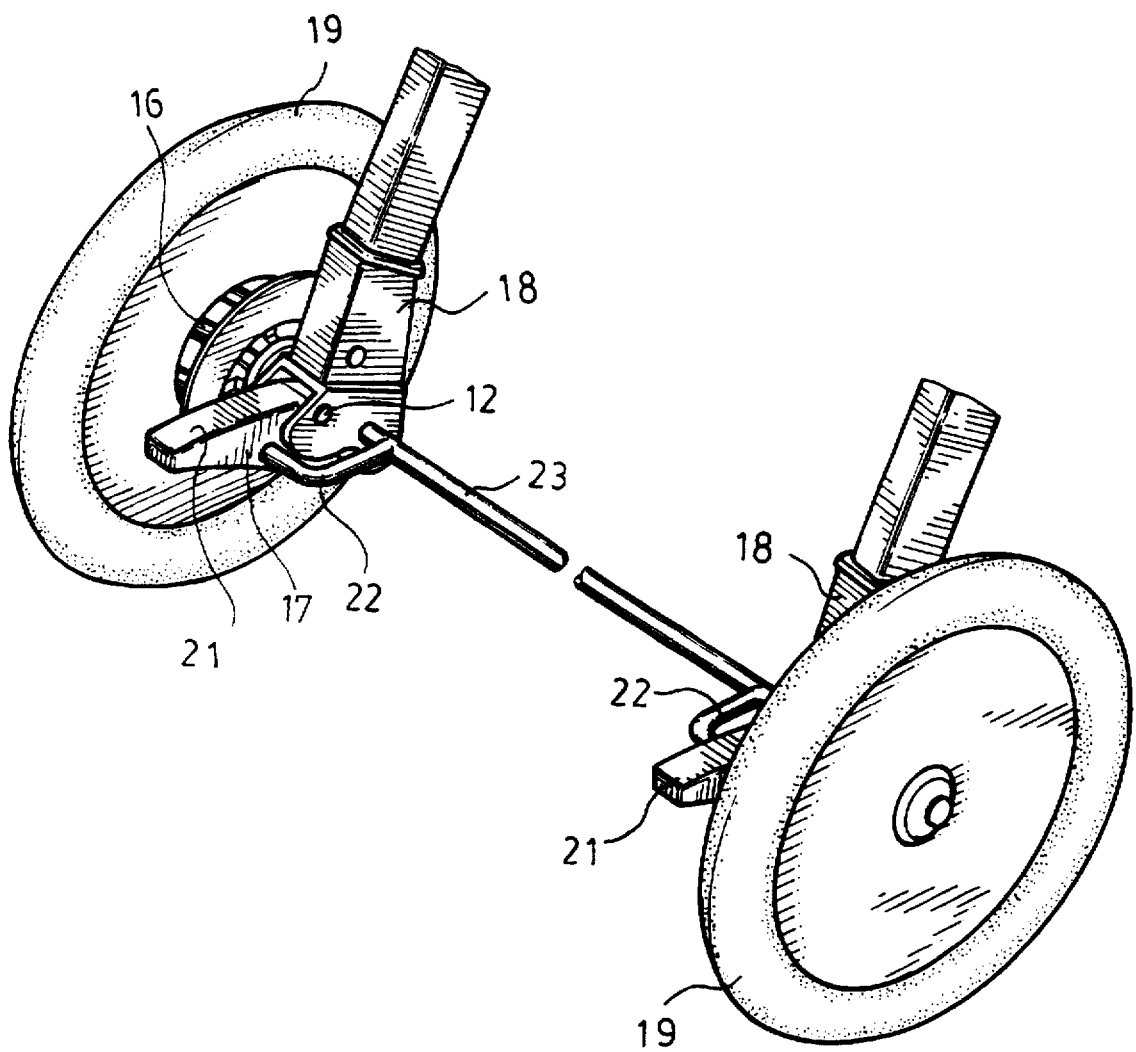
FIG. 2 is a perspective view showing the structure of a brake assembly for simultaneously holding paired wheels according to the first embodiment of the present application.

The first embodiment of the present application will be described with reference to FIG. 2. FIG. 2 is a perspective view showing the brake assembly for simultaneously holding paired wheels according to the first embodiment of the present application. In this embodiment, the pedals (21) for each of the rear wheels, that is, the pivotal blocks (17) as above mentioned, are each connected to the rear wheel axle (23) by a stick (22). With such connection, the brakes of a pair of wheels are linked to each other. When the pedal of either side is stepped down, the brakes of both side are operated simultaneously to hold the pair of wheels at the same time. Similarly, when the pedal of either side under a stepped-down (locked) situation is pushed upwardly and becomes unlocked, the brakes of both wheels are simultaneously released with the effect of linkage.

The present embodiment thus unites the link and the rear wheel axle to reduce materials consumed and simplify the structure of the assembly. Particularly, with the arrangement of the present embodiment, the stability and safety of the assembly can be improved significantly.

The Second Embodiment

Figure 3:
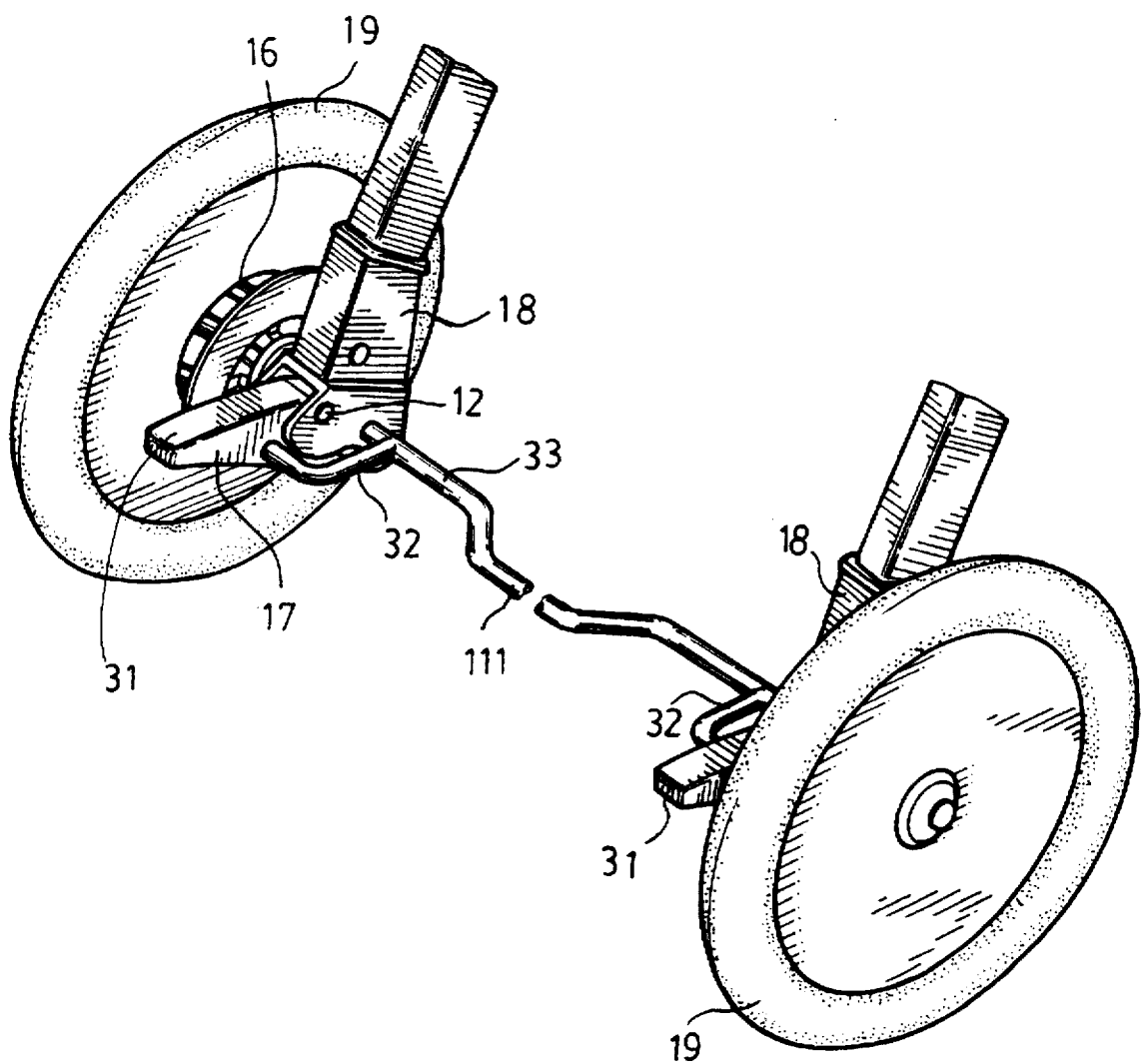
FIG. 3 is a perspective view showing the structure of a brake assembly for simultaneously holding paired wheels according to the second embodiment of the present application.

The second embodiment of the present application will be described with reference to FIG. 3. FIG. 3 is a perspective view showing the brake assembly for simultaneously holding paired wheels according to the second embodiment of the present application. In this embodiment, two pedals (31) for each of the rear wheels, that is, the pivotal blocks (17) as above mentioned, are each connected to the rear wheel axle (33) by a stick (32). With such connection, the brakes of a pair of wheels are linked to each other. When the pedal of either side is stepped down, the brakes of both side are operated simultaneously to hold the pair of wheels at the same time. Similarly, when the pedal of either side under a stepped-down (locked) situation is pushed upwardly and becomes unlocked, the brakes of both wheels are simultaneously released with the effect of linkage. The difference between the first embodiment and the this embodiment resides in that the rear wheel axle is provided with a central bent portion (111) at the central portion thereof, which is on the same plane as that of the pedals. The central bent portion (111) may be used as another pedal. Therefore, when one of the pedals or the central bent portion is stepped down and becomes locked, the brakes of both wheels are switched into the status of holding by the effect of linkage. Similarly, when one of the pedals or the central bent portion (111) under the locked status is pushed upwardly and becomes the unlocked, the brakes of both wheels are switched to be released.

This embodiment also unites the couple stick and the rear wheel axle to reduce materials consumed and simplify the structure of the assembly. Particularly, with the arrangement of the present embodiment, the stability and safety of the assembly can be improved significantly. Furthermore, since the rear wheel axle is provided with an additional portion controlling the locking/unlocking operation, the braking operation of the stroller is further facilitated.

The Third Embodiment

Figure 4:
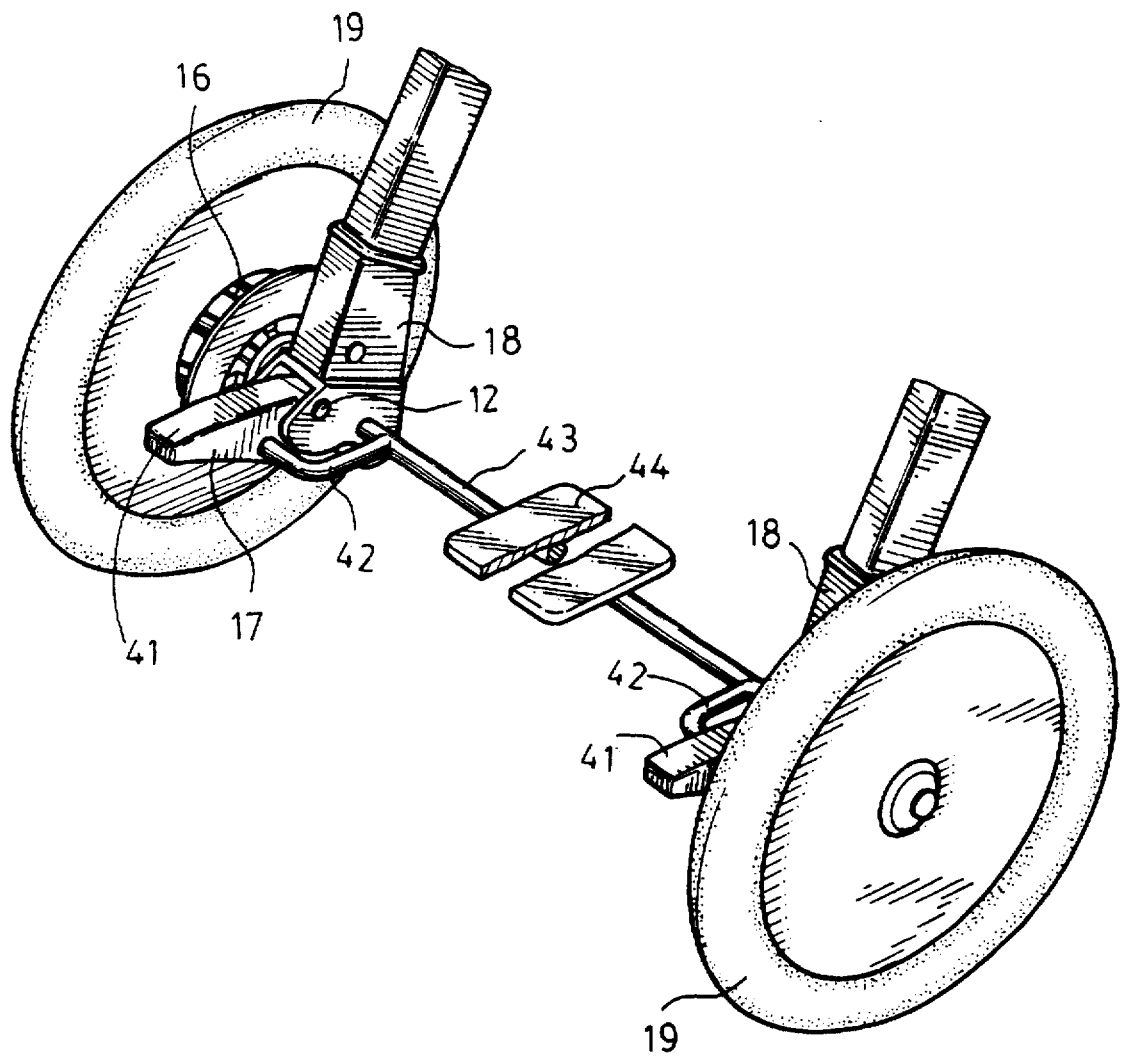
FIG. 4 is a perspective view showing the structure of a brake assembly for simultaneously holding paired wheels according to the third embodiment of the present application.
Figure 5:
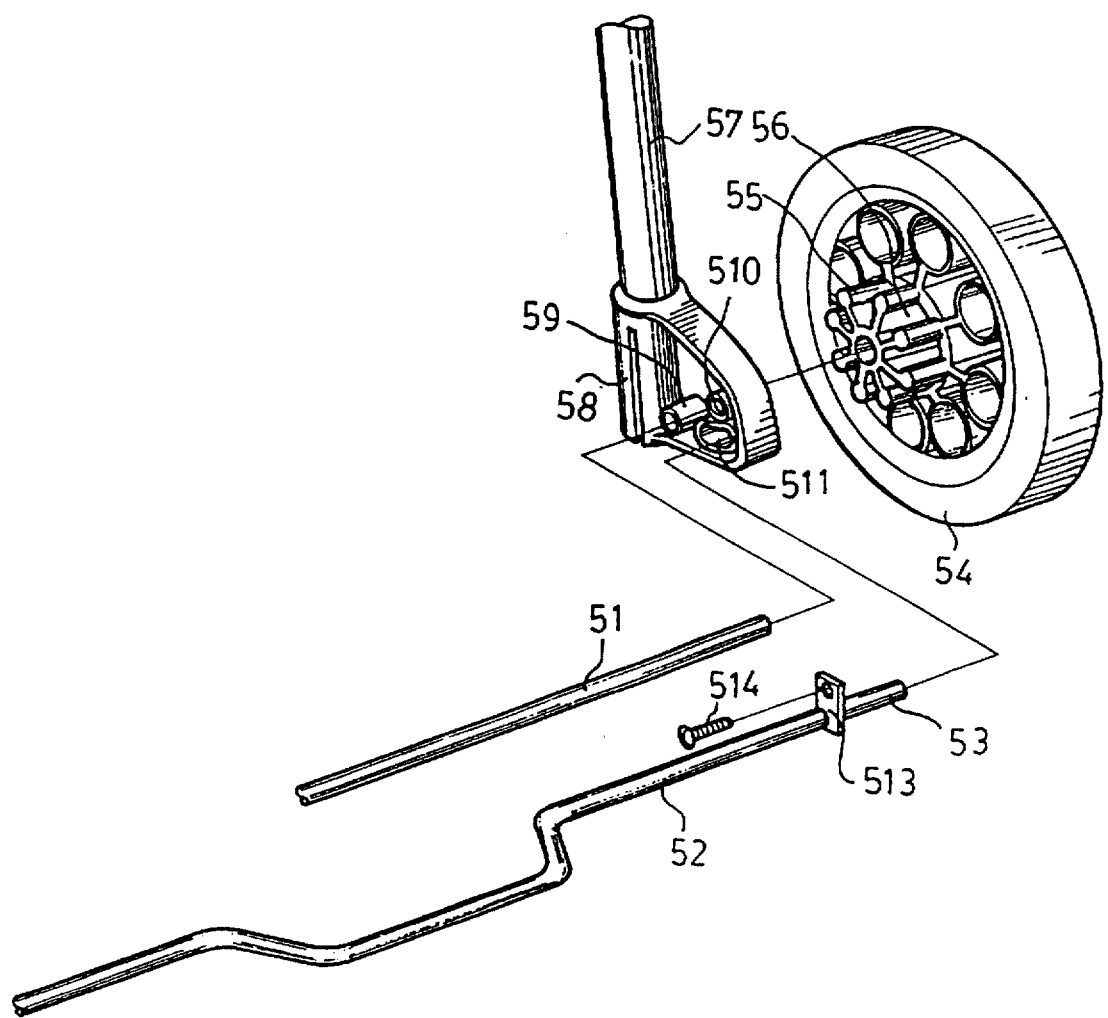
FIG. 5 is a broken perspective view showing the conventional brake assembly for simultaneously holding paired wheels.

The third embodiment of the present application will be described with reference to FIG. 4. FIG. 4 is a perspective view showing the brake assembly for simultaneously holding paired wheels according to the first embodiment of the present application. In this embodiment, the pedals (41) for each of the rear wheels, that is, the pivotal block (17) as above mentioned, are each connected to the rear wheel axle (43) by a stick (42). With such connection, the brakes of a pair of wheels are linked to each other. When the pedal of either side is stepped down, the brakes of both side are operated simultaneously to hold the pair of wheels at the same time. Similarly, when the pedal of either side under a stepped-down (locked) situation is pushed upwardly and becomes unlocked, the brakes of both wheels are simultaneously released with the effect of linkage. The difference between the first embodiment and the this embodiment resides in that the rear wheel axle is provided with a central pedal member (44) on the central portion threof, which is on the same plane as that of the pedals of both wheels. Therefore, when one of the pedals of the two wheels or the central pedal member is stepped down and becomes locked, the brakes of both wheels simultaneously functions to stop the stroller with the effect of linkage by the rear wheel axle (43). Similarly, when one of the pedals of two wheels or the central pedal member (44) under a stepped-down status is pushed upwardly and becomes unlocked, the brakes of both wheels are released with the effect of linkage by the rear wheel axle (43).

This embodiment exceptionally facilitates the control of the wheel locking/unlocking operation for a stroller. In the prior art stroller, when the braked and locked stroller is to be switched to an unlock status, the user has to lean down and pull the pedal with one's hand or hook up the pedal with one's foot. Such operation is not only inconvenient but also may damage a user's shoe or even hurt his (her) foot. In the present embodiment, a mere operation of stepping down the front rim of the central pedal is adequate to unlock the wheel of a stroller and thus the problem in the prior art can be solved effectively.

Although the features and advantages of the present application are described through the above embodiments with reference to the accompanying drawings, it should be understood that the scope of the present application is not limited within the above embodiments. Various changes and modifications can be achieved without departing from the spirit of the present application whose scope is defined by the appended claims.

What is claimed:

1. A brake assembly for simultaneously holding a pair of wheels, comprising:

a pair of base members for supporting a pair of wheels;

a pair of rib wheels each of which is composed of a plurality of ribs with a predetermined pitch, and is connected to a corresponding one of said pair of wheels so that each of said rib wheels rotates when its corresponding wheel rotates, and wherein a space is provided between each two stopping ribs;

a pair of pivotal blocks each of which is pivotally connected to a corresponding one of said base members by a pivotal rivet, and has a protruding brake element capable of being engaged into a space between said ribs to engage therewith;

a wheel axle connecting said two base members; and a pair of bent sticks connecting said wheel axle with said pair of pivotal blocks, whereby each of said pair of pivotal blocks is pivotable with respect to its corresponding rivet and said wheel axle, and whereby each pivotal rivet is noncoaxial with said rear wheel axle.

2. The brake assembly for simultaneously holding a pair of wheels according to claim 1 wherein each pivotal rivet is located at the vicinity of the mid-point between said rear wheel axle and a connecting point of a corresponding one of said pivotal blocks and a corresponding one of said bent sticks and at the vicinity of the mid-point between the location of said corresponding one of said bent sticks under a locked status and the location of the corresponding one of the bent sticks under an unlocked status.

3. The brake assembly for simultaneously holding a pair of wheels according to claim 1, wherein said wheel axle is provided with a bent portion at a central portion of the wheel axle.

4. The brake assembly for simultaneously holding a pair of wheels according to claim 1, wherein said wheel axle is provided with a pedal located at a central portion of the wheel axle.

5. A brake assembly for simultaneously holding a pair of wheels, comprising:

a pair of base members for supporting a pair of wheels;

a pair of rib wheels, wherein each of said rib wheels is composed of a plurality of ribs with a predetermined pitch to form braking spaces between said ribs and each of said rib wheels is connected to a corresponding one of said pair of wheels so that each of said rib wheels rotates when its corresponding wheel rotates;

a pair of pivotal blocks, wherein each of said pivotal blocks is pivotally connected to a corresponding one of said base members by a pivotal rivet, and wherein each of said pivotal blocks has a protruding brake element capable of being positioned into one of said braking spaces between the ribs of the rib wheels to engage a rib of said rib wheel;

a wheel axle connecting said two base members; and a pair of bent sticks connecting said wheel axle with said pair of pivotal blocks, whereby each of said pivotal blocks is pivotable with respect to said wheel axle and its corresponding pivotal rivet, whereby each of said pair of pivotal blocks has two extremes of motion, and at one of said extremes, the protruding brake element engages a rib of the rib wheel, and at the other of said extremes, the protruding brake element does not engage a rib of the rib wheel; and whereby said rear wheel axle is non-coaxial with each pivotal rivet.

6. The brake assembly for simultaneously holding a pair of wheels according to claim 5, wherein each pivotal rivet is located at the vicinity of the mid-point between said rear wheel axle and a connecting point of a corresponding one of said pivotal blocks and a corresponding one of said bent sticks and at the vicinity of the mid-point between the location of said corresponding one of said bent sticks under a locked status and the location of the corresponding one of the bent sticks under an unlocked status.

7. The brake assembly for simultaneously holding a pair of wheels according to claim 5, wherein said wheel axle is provided with a bent portion at a central portion of the wheel axle.

8. The brake assembly for simultaneously holding a pair of wheels according to claim 5, wherein said wheel axle is provided with a pedal located at a central portion of the wheel axle.

9. A brake assembly for simultaneously holding a pair of wheels, comprising:

a pair of wheel support means for supporting a pair of wheels;

a pair of rib wheels, wherein each of said rib wheels is composed of a plurality of ribs with a predetermined pitch to form braking spaces between said ribs and each of said rib wheels is connected to a corresponding one of said pair of wheels so that each of said rib wheels rotates when its corresponding wheel rotates;

a pair of pivotal blocks, wherein each of said pivotal blocks is pivotally connected to a corresponding one of said wheel support means by a pivoting means, and wherein each of said pivotal blocks has a protruding brake element capable of being positioned into one of said braking spaces between the ribs of the rib wheels to engage a rib of said rib wheel;

each of said rib wheels being attached to a wheel axle, and each of said rib wheels being rotatable upon its wheel axle; and a pair of connecting means, each of which is connected to its wheel axle and a corresponding one of said pair of pivotal blocks, whereby each block of said pair of pivotal blocks is pivotable with respect to its wheel axle and to the pivoting means, whereby each block of said pair of pivotal blocks has two extremes of motion, and at one of said extremes, the protruding brake element engages a rib of the corresponding one of the rib wheels, and at the other of said extremes, the protruding brake element does not engage a rib of the corresponding one of the rib wheels; and whereby said rear wheel axle and said pivoting means are non-coaxial.

10. The brake assembly for simultaneously holding a pair of wheels according to claim 9, wherein each of said pivotal rivets is located at the vicinity of the mid-point between said rear wheel axle and a connecting point of one of said pivotal blocks and a corresponding one of said connecting means and at the vicinity of the mid-point between the location of said connecting means under a locked status and the location of the connecting means under an unlocked status.

11. The brake assembly for simultaneously holding a pair of wheels according to claim 9, wherein said wheel axle is provided with a bent portion at a central portion of the wheel axle.

12. The brake assembly for simultaneously holding a pair of wheels according to claim 9, wherein said wheel axle is provided with a pedal located at a central portion of the wheel axle.

* * * * *